US012620843B2

(12) United States Patent
Suzuki et al.

(10) Patent No.: US 12,620,843 B2
(45) Date of Patent: May 5, 2026

(54) STATOR AND ROTARY ELECTRIC MACHINE

(71) Applicant: Panasonic Intellectual Property Management Co., Ltd., Osaka (JP)

(72) Inventors: Kenta Suzuki, Osaka (JP); Noritaka Aso, Kyoto (JP); Toshiyuki Tamamura, Osaka (JP); Yuya Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 195 days.

(21) Appl. No.: 18/568,307

(22) PCT Filed: May 27, 2022

(86) PCT No.: PCT/JP2022/021828
§ 371 (c)(1),
(2) Date: Dec. 8, 2023

(87) PCT Pub. No.: WO2022/264787
PCT Pub. Date: Dec. 22, 2022

(65) Prior Publication Data
US 2024/0275218 A1      Aug. 15, 2024

(30) Foreign Application Priority Data

Jun. 18, 2021      (JP) ................................. 2021-101895

(51) Int. Cl.
H02K 1/14 (2006.01)
H02K 3/32 (2006.01)
H02K 3/34 (2006.01)

(52) U.S. Cl.
CPC ............. *H02K 1/146* (2013.01); *H02K 3/325* (2013.01); *H02K 3/34* (2013.01); *H02K 2213/03* (2013.01)

(58) Field of Classification Search
CPC .......... H02K 1/146; H02K 3/325; H02K 3/34; H02K 2213/03; H02K 1/2773; H02K 2203/12; H02K 3/345; H02K 1/148
See application file for complete search history.

(56) References Cited

U.S. PATENT DOCUMENTS 7,663,285 B2 * 2/2010 Yumoto ................. H02K 3/522
310/194
2012/0175993 A1 7/2012 Jang et al.
2019/0157928 A1 5/2019 Watanabe et al.

FOREIGN PATENT DOCUMENTS

JP       2014-131480       7/2014
JP       2019-134502       8/2019
WO       2018/020631       2/2018

OTHER PUBLICATIONS

International Search Report of PCT application No. PCT/JP2022/021828 dated Jul. 19, 2022.
(Continued)

*Primary Examiner* — Tulsidas C Patel
*Assistant Examiner* — Mohammed Ahmed Qureshi
(74) *Attorney, Agent, or Firm* — Rimon P.C.

(57) ABSTRACT

A stator includes a stator core, an insulator, and a coil. The stator core includes: a yoke having an annular shape; and teeth protruding from the yoke to the inside of the yoke. The insulator covers at least a part of the stator core. The insulator includes: a first face facing the coil wound around the teeth; and a second face facing the yoke. The first face is perpendicular to the protrusion direction of the teeth. The second face includes: a first perpendicular face perpendicular to the protrusion direction of the teeth; and a first inclined
(Continued)

face inclined toward the first face with respect to the first perpendicular face. The yoke includes an inner circumferential face facing the second face.

8 Claims, 5 Drawing Sheets

(56)                      References Cited

OTHER PUBLICATIONS

The EPC Office Action dated Oct. 4, 2024 for the related European Patent Application No. 22824781.3.

* cited by examiner

STATOR AND ROTARY ELECTRIC MACHINE

CROSS-REFERENCE TO RELATED APPLICATIONS

This application is a U.S. national stage application of the PCT International Application No. PCT/JP2022/021828 filed on May 27, 2022, which claims the benefit of foreign priority of Japanese patent application No. 2021-101895 filed on Jun. 18, 2021, the contents all of which are incorporated herein by reference.

BACKGROUND

1. Technical Field

The present disclosure generally relates to a stator and a rotary electric machine. More specifically, the present disclosure relates to a stator including an insulator and a rotary electric machine including the stator.

2. Description of the Related Art

Patent Literature 1 discloses an electric motor including: a rotor rotatable about a rotation axis; and a stator including a stator core and a winding wound around the stator core.

Citation List

Patent Literature 1: WO 2018/020631

SUMMARY

For such electric motor described in Patent Literature 1, there has been a demand to substantially prevent a reduction of the torque of the electric motor due to the saturation of magnetic flux density (magnetic saturation) in the stator.

In view of the above-mentioned circumstances, an object of the present disclosure is to provide a stator and a rotary electric machine including the stator, the stator being capable of reducing the possibility of a reduction of the torque of the rotary electric machine.

A stator according to one aspect of the present disclosure includes a stator core, an insulator, and a coil. The stator core includes an annular-shaped yoke and teeth protruding from the yoke to the inside of the yoke. The insulator covers at least a part of the stator core. The coil is disposed around at least one of the teeth via the insulator. The insulator includes a first face facing the coil and a second face facing the yoke. The first face is perpendicular to the protrusion direction of the teeth. The second face includes: a first perpendicular face perpendicular to the protrusion direction of the teeth; and a first inclined face inclined toward the first face with respect to the first perpendicular face. The yoke includes an inner circumferential face facing the second face.

The rotary electric machine according to one aspect of the present disclosure includes the stator and a rotor. The rotor is disposed inside the stator and configured to rotate with respect to the stator.

According to the present disclosure, there can be provided a stator and a rotary electric machine including the stator, the stator being capable of reducing the possibility of a reduction of the torque of the rotary electric machine.

DETAILED DESCRIPTIONS

Figure 1:
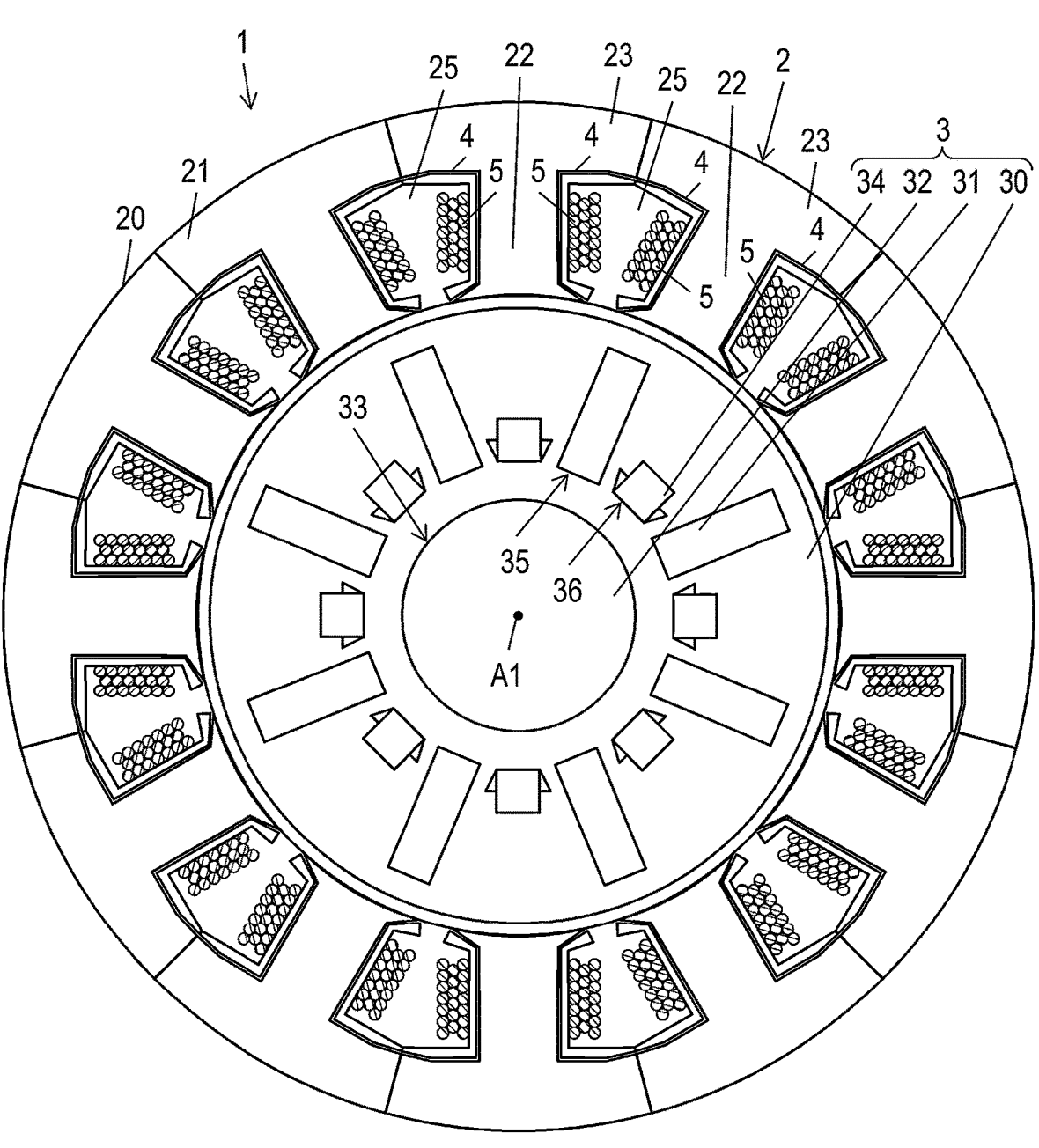
FIG. 1 is a cross-sectional view of a rotary electric machine according to an embodiment.

Rotary electric machine 1 according to an embodiment of the present disclosure will be described in detail with reference to the drawings. Note that the embodiment and modifications described below are merely examples of the present disclosure, and the present disclosure is not limited to the embodiment and the modifications. In embodiments other than the following embodiment and modifications, various changes may be made according to design requirements and other conditions within a scope that does not deviate from the technical concept of the present disclosure. Furthermore, the drawings described in the following embodiment are schematic diagrams, hence the size and thickness proportions of constituents in the drawings are not necessarily actual dimensional proportions. Furthermore, the following embodiments (including the modifications) may be suitably implemented in combination.

(1) OUTLINE

Figure 2:
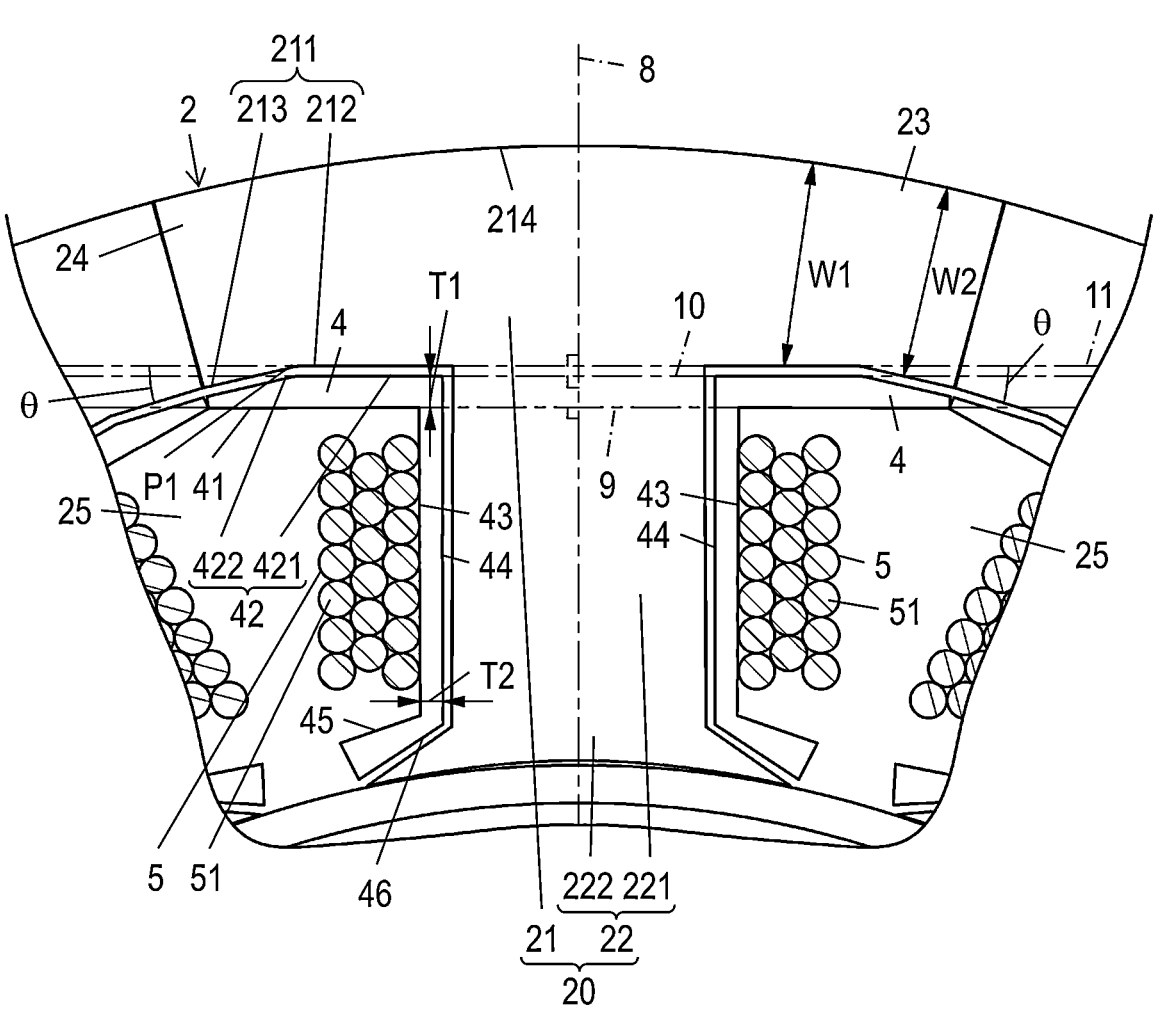
FIG. 2 is a partial cross-sectional view of a stator according to the embodiment.

First, the outline of rotary electric machine 1 of the present embodiment will be described with reference to FIG. 1 and FIG. 2. FIG. 1 is a cross-sectional view of rotary electric machine 1 according to the embodiment. FIG. 2 is a partial cross-sectional view of stator 2 according to the embodiment.

As illustrated in FIG. 1, rotary electric machine 1 includes: stator 2; and rotor 3 disposed inside stator 2 and configured to rotate with respect to stator 2. A gap is provided between stator 2 and rotor 3, and rotor 3 rotates about rotation axis A1 in a non-contact manner with stator 2.

As illustrated in FIG. 1 and FIG. 2, stator 2 includes stator core 20, insulator 4, and coil 5. Stator core 20 includes annular-shaped yoke 21 and teeth 22 (twelve teeth in the present embodiment) protruding from yoke 21 to the inside of yoke 21. Insulator 4 covers at least a part of stator core 20. Coil 5 is disposed around at least one of teeth 22 via insulator 4.

Here, as illustrated in FIG. 2, insulator 4 includes: first face 41 facing coil 5; and second face 42 facing yoke 21. First face 41 is perpendicular to the protrusion direction of teeth 22. Second face 42 includes: first perpendicular face 421 perpendicular to the protrusion direction of teeth 22; and first inclined face 422 inclined toward first face 41 with respect to first perpendicular face 421.

Yoke 21 includes inner circumferential face 211 facing second face 42 of insulator 4.

(2) DETAILS

Hereinafter, rotary electric machine 1 according to the present embodiment will be described in detail with reference to FIG. 1 and FIG. 2. Note that the term "perpendicular" used in the present disclosure denotes not only a perfectly perpendicular state, but also a substantially perpendicular state in which two flat faces form an angle of 90±5°. Furthermore, the term "parallel" used in the present disclosure denotes not only a perfect parallel state, but also a substantially parallel state in which two flat faces form an angle of 5° or smaller.

(2.1) Rotary Electric Machine

Rotary electric machine 1 in the present embodiment is a brushless motor, for example. As illustrated in FIG. 1, rotary electric machine 1 includes: stator 2; and rotor 3 configured to rotate with respect to stator 2. Stator 2 includes stator core 20, insulator 4, and, for example, twelve coils 5. Stator core 20 includes: annular-shaped yoke 21; and, for example, twelve teeth 22 protruding from yoke 21 to the inside of the yoke 21. Each of coils 5 is disposed around a corresponding one of teeth 22 via insulator 4. Rotor 3 includes rotor core 30, for example, eight first permanent magnets 31, for example, eight second permanent magnets 31, and output shaft 32. Eight first permanent magnets 31 and eight second permanent magnets 34 are held by rotor core 30. Rotor 3 is disposed inside stator 2 with a gap between rotor 3 and stator 2 and configured to rotate about rotation axis A1 with respect to stator 2. More specifically, by an interaction of a magnetic flux produced when a current flows through coils 5 with a magnetic flux produced by first permanent magnets 31 and second permanent magnets 34, a force to rotate rotor 3 is produced. The rotation force (driving force) of rotor 3 is transmitted from output shaft 32 to the outside.

(2.2) Stator

As illustrated in FIG. 1, stator core 20 of stator 2 includes: annular-shaped yoke 21 centered around rotation axis A1; and, for example, twelve teeth 22 protruding from yoke 21 to the inside of yoke 21 in the radial direction centering rotation axis A1. Note that stator core 20 in the present embodiment includes, for example, twelve split cores 23 circumferentially disposed around rotation axis A1. Split core 23 is formed, for example, in such a manner that a plurality of magnetic substance sheets is laminated in the axial direction of rotation axis A1. As illustrated in FIG. 2, each of split cores 23 includes: yoke unit 24; and one tooth 22 protruding from the inside of yoke unit 24 in the radial direction of yoke 21 (the radial direction centering rotation axis A1). Yoke unit 24 has an arc shape centered around the axis of yoke 21 (rotation axis A1) when viewed in the axial direction of yoke 21 (the axial direction of rotation axis A1). That is, in the present embodiment, as illustrated in FIG. 1 and FIG. 2, twelve split cores 23 are circumferentially disposed, centering around rotation axis A1, so that annular-shaped yoke 21 is formed in which twelve yoke units 24 are disposed to be centered around rotation axis A1. Thus, twelve teeth 22 are circumferentially disposed around rotation axis A1, while being spaced from each other. Note that the number of split cores 23 is not limited to twelve pieces, but may be eleven pieces or less, or may be thirteen pieces or more. Furthermore, stator core 20 may not include split cores 23, but include one unsplittable component.

Twelve teeth 22 are circumferentially disposed around rotation axis A1 at regular intervals. As illustrated in FIG. 2, each of teeth 22 includes: body 221 whose width remains constant along the protrusion direction of teeth 22; and leg 222 whose width gradually increases toward rotation axis A1 in the protrusion direction. Note that, in FIG. 2, virtual line 8 indicates the protrusion direction of teeth 22 and is devoid of substance.

Stator 2 includes insulator 4. Insulator 4 is formed from a material such as synthetic resin and has electrical insulating properties. Insulator 4 covers a region including at least a part of body 221 and at least a part of leg of each of teeth 22 and at least a part of (later-described) inner circumferential face 211 of yoke 21. As illustrated in FIG. 2, coil 5 is disposed around each of teeth 22 via insulator 4. That is, twelve coils 5 correspond to twelve teeth 22 on a one-to-one basis, and each of coils 5 is formed of winding 51 wound around a corresponding one of teeth 22 via insulator 4. As the winding way of winding 51, for example, concentrated-winding is employed. Winding 51 forming coil 5 is a round wire having a round cross section, for example.

As illustrated in FIG. 2, insulator 4 includes: first face 41 facing coils 5 wound around teeth 22; and second face 42 facing yoke 21. First face 41 is perpendicular to the protrusion direction of teeth 22. That is, virtual flat face 9 including first face 41 and virtual line 8 indicating the protrusion direction of teeth 22 intersect at right angles. Second face 42 includes: first perpendicular face 421 perpendicular to the protrusion direction of teeth 22; and first inclined face 422 inclined toward first face 41 with respect to first perpendicular face 421. That is, virtual flat face 10 including first perpendicular face 421 is orthogonal to virtual line 8. First inclined face 422 is a flat face, for example, that is contiguous to first perpendicular face 421 and forms an angle larger than 0° and smaller than 180° with first perpendicular face 421. Note that first inclined face 422 may be a curved face or may include a plurality of contiguous flat faces that form an angle larger than 0° and smaller than 180° with each other.

Insulator 4 further includes third face 43 and fourth face 44, which are on the opposite sides. Third face 43 faces coils 5, meanwhile fourth face 44 faces body 221 of each of teeth 22. Third face 43 and fourth face 44 are parallel to the protrusion direction of teeth 22. That is, third face 43 and fourth face 44 are perpendicular to first face 41 and first perpendicular face 421 of second face 42, respectively.

Here, in the present embodiment, thickness T1 of insulator 4 between first face 41 and first perpendicular face 421 is larger than thickness T2 of insulator 4 between third face 43 and fourth face 44. Note that thickness T1 may be smaller than thickness T2 or may be equal to thickness T2.

Insulator 4 further includes fifth face 45 and sixth face 46, which are on the opposite sides. Fifth face 45 faces coils 5, meanwhile sixth face 46 faces body 222 of each of teeth 22.

Here, first face 41, third face 43, and fifth face 45 form an angle larger than 0° and smaller than 180° with each other and are contiguous to each other, and thus constitute the inner face of insulator 4, the inner face being wound around coils 5.

Furthermore, second face 42, fourth face 44, and sixth face 46 form an angle larger than 0° and smaller than 180° with each other and are contiguous to each other, and thus constitute the outer face of insulator 4, the outer face being in contact with split cores 23. In the present embodiment, first perpendicular face 421 of second face 42 is, for example, perpendicular to fourth face 44.

Yoke 21 includes inner circumferential face 211 facing and being in contact with second face 42 of insulator 4. More specifically, as illustrated in FIG. 2, yoke unit 24 of each of split cores 23 includes inner circumferential face 211. Here, inner circumferential face 211 is the inner face of yoke unit 24, the inner face facing coils 5 via insulator 4.

Inner circumferential face 211 includes: second perpendicular face 212 facing first perpendicular face 421 of insulator 4; and second inclined face 213 facing first inclined face 422 of insulator 4. Second perpendicular face 212 is perpendicular to the protrusion direction of teeth 22. That is, virtual flat face 11 including second perpendicular face 212 is orthogonal to virtual line 8. Furthermore, first perpendicular face 421 is parallel to second perpendicular face 212. Second inclined face 213 is inclined toward second face 42 of insulator 4 with respect to second perpendicular face 212. Here, in the present embodiment, second inclined face 213 is, for example, a flat face. Note that second inclined face 213 is not limited to a flat face and may be a curved face.

Second perpendicular face 212 forms an angle larger than 0° and smaller than 180° with second inclined face 213 and is contiguous to second inclined face 213. When viewed in the axial direction of yoke 21 (the direction of rotation axis A1), bend point P1 serves as a boundary between second perpendicular face 212 and second inclined face 213.

As illustrated in FIG. 2, second inclined face 213 is inclined an angle θ toward second face 42 of insulator 4 with respect to second perpendicular face 212. Here, the angle θ preferably satisfies $0° < θ ≤ (180/N)°$. N represents the number of slots 25 of stator core 20 and is an integer not less than 2. Note that slot 25 is a space between two teeth 22 circumferentially adjacent to each other. In the present embodiment, as illustrated in FIG. 1, N is, for example, 12 and hence the angle θ preferably satisfies $0° < θ ≤ 15°$.

Yoke 21 further includes outer circumferential face 214 opposite inner circumferential face 211. More specifically, as illustrated in FIG. 2, yoke unit 24 of each of split cores 23 includes outer circumferential face 214. Here, outer circumferential face 214 is an arc-shaped face having an arc-shaped cross section perpendicular to the axial direction of annular-shaped yoke 21 (the direction of rotation axis A1). That is, outer circumferential faces 214 of twelve yoke units 24 are circumferentially disposed around rotation axis A1 to form outer peripheral circle of annular-shaped yoke 21.

Note that, in yoke 21, the entirety of outer circumferential face 214 may not necessarily be configured to be arc-shaped, but, at least a part of outer circumferential face 214 is beneficially arc-shaped.

(2.3) Rotor

As illustrated in FIG. 1, rotor 3 includes rotor core 30, for example, eight first permanent magnets 31, for example, eight second permanent magnets 34, and output shaft 32. Rotor core 30 is formed of, for example, a plurality of electromagnetic steel plates stacked on top of each other in the direction of rotation axis A1. Rotor core 30 is formed in the shape of a cylinder around rotation axis A1. The thickness of rotor core 30 in the direction of rotation axis A1 is equal to, for example, the thickness of stator core 20 in the direction of rotation axis A1. Note that, in the present disclosure, the term "equal" includes not only a strictly identical state, but also a state of difference within tolerance.

Shaft hole 33 is provided inside rotor core 30, and output shaft 32 is held by shaft hole 33. Output shaft 32 is a long metal shaft. Rotor core 30 and output shaft 32 rotate in an integrated manner.

In the present embodiment, rotor core 30 includes eight first holes 35 and eight second holes 36.

As illustrated in FIG. 1, eight first holes 35 and eight second holes 36 are radially disposed around output shaft 32. Furthermore, eight first holes 35 are disposed at regular intervals along the circumferential direction of rotor core 30 (the rotation direction of output shaft 32). Likewise, eight second holes 36 are disposed at regular intervals along the circumferential direction of rotor core 30. First holes 35 and second holes 36 are alternately circumferentially disposed. Each of first holes 35 extends in the radial direction of rotor core 30 (a direction being at right angles to the axial direction of output shaft 32). That is, eight first holes 35 are disposed so as to radiate from output shaft 32 like spokes. In the present embodiment, the plan-view shape of first hole 35 is a rectangle in which the radial direction of rotor core 30 is regarded as the longitudinal direction. Here, the radial length of rotor core 30 of each of second holes 36 is shorter than the radial length of rotor core 30 of each of first holes 35.

Eight first permanent magnets 31 are disposed in eight first holes 35 on a one-to-one basis. First permanent magnets 31 are main magnets of rotor 3. First permanent magnet 31 has a rectangular plan-view shape in which the radial direction of rotor core 30 is regarded as the longitudinal direction. As an example, first permanent magnet 31 is in the shape of a plate-like rectangular parallelepiped. First permanent magnets 31 are disposed in such a manner that the magnetic pole direction of first permanent magnets 31 is aligned with the circumferential direction of rotor core 30 (the rotation direction of output shaft 32). That is, one circumferential face of one first permanent magnet 31 serves as the N-pole thereof, meanwhile another circumferential face opposite the face serving as the N-pole serves as the S-pole. Note that two first permanent magnets 31 circumferentially adjacent to each other are disposed in such a manner that poles of the same polarity face each other.

Eight second permanent magnets 34 are disposed in eight second holes 36 on a one-to-one basis. That is, second permanent magnet 34 is disposed between two first permanent magnets 31 circumferentially adjacent to each other. In the present embodiment, second permanent magnet 34 is an auxiliary magnet of rotor 3. Second permanent magnet 34 has a rectangular plan-view shape with a small aspect ratio. As an example, second permanent magnet 34 is in the shape of a rod-like rectangular parallelepiped. Second permanent magnets 34 are disposed in such a manner that the magnetic pole direction of second permanent magnets 34 is aligned with the radial direction of rotor core 30 (a direction being at right angles to output shaft 32). That is, one circumferential face of one second permanent magnet 34 serves as the N-pole thereof, meanwhile another circumferential face opposite the face serving as the N-pole serves as the S-pole. Note that the magnetic poles, the N- and S-poles, of two second permanent magnets 34 circumferentially adjacent to each other across one first permanent magnet 31 are oriented in opposite directions.

Here, second permanent magnet 34 is disposed in such a manner that the magnetic pole on the radially outer side (closer to stator 2) of second permanent magnet 34 is the same as the magnetic poles in the respective facing faces of two first permanent magnets 31 circumferentially adjacent to each other across said second permanent magnet 34. Thus, a part of rotor core 30 functions as a virtual magnetic pole, the part being surrounded by two first permanent magnets 31 circumferentially adjacent to each other and one second permanent magnet 34 disposed between said two first permanent magnets 31 circumferentially adjacent to each other.

As first permanent magnet 31 and second permanent magnet 34, for example, a neodymium magnet, a ferrite magnet, or a plastic magnet can be employed.

Thus, eight first permanent magnets 31 and eight second permanent magnets 34 are accommodated in rotor core 30. That is, rotary electric machine 1 has what-is-called an interior permanent magnet (IPM) structure. Note that the structure of rotary electric machine 1 is not limited to the interior permanent magnet structure, but may be, for example, what-is-called a surface permanent magnet (SPM) structure in which a plurality of permanent magnets is attached to the surface of rotor core 30.

Second permanent magnet 34 is not an essential constituent of rotor core 30, and rotor core 30 may include only first permanent magnet 31 as a permanent magnet. First hole 35 has a rectangular plan-view shape in which the radial direction of rotor core 30 is regarded as the transverse direction meanwhile the circumferential direction of rotor core 30 is regarded as the longitudinal direction. In this case, first permanent magnet 31 is disposed so that the magnetic pole direction of first permanent magnet 31 is aligned with the radial direction of rotor core 30.

(3) OPERATION AND ADVANTAGE

In rotary electric machine 1 of the present embodiment, a force (torque) to rotate rotor 3 is produced by an interaction of a magnetic flux produced when a current flows through coils 5 wound around teeth 22 with a magnetic flux produced by first permanent magnets 31 and second permanent magnets 34.

The magnetic flux produced in the inside of teeth 22 when a current flows through coils 5 flows out from ends equivalent to the N-poles of teeth 22 and circumferentially passes through the inside of yoke 21. Here, the number of magnetic fluxes produced when a current flows through coils 5 increases as the value of the current flowing through coils 5 increases. However, a predetermined level or higher of magnetic flux density causes the occurrence of magnetic saturation in which an increase in magnetic flux density with respect to an increase in current is saturated, which leads to a possibility of a decrease in the torque of rotary electric machine 1.

Therefore, in rotary electric machine 1 of the present embodiment, a cross-sectional area in which a magnetic flux circumferentially passes through yoke 21 is increased to substantially prevent the occurrence of the magnetic saturation.

Specifically, second face 42 of insulator 4 includes: first perpendicular face 421; and first inclined face 422 inclined toward first face 41 with respect to first perpendicular face 421, and inner circumferential face 211 of yoke 21 in contact with second face 42 of insulator 4 includes: second perpendicular face 212; and second inclined face 213 inclined toward second face 42 with respect to second perpendicular face 212. With this configuration, as illustrated in FIG. 2, the radial distance (thickness W1) between second perpendicular face 212 and outer circumferential face 214 of yoke 21 can be larger than the radial distance (thickness W2) between second inclined face 213 and outer circumferential face 214 of yoke 21. Thus, the occurrence of magnetic saturation in a portion corresponding to thickness W1 of yoke 21 can be substantially prevented.

Furthermore, in rotary electric machine 1 of the present embodiment, first face 41 of insulator 4 is perpendicular to the protrusion direction of teeth 22, and therefore, the entirety of an arrangement region of coils 5, the region being formed by faces (first face 41, third face 43, and fifth face 45) facing coils 5 of insulator 4 can be positioned on a winding route for winding coils 5 around teeth 22. Thus, collapse of coils 5 can be prevented, whereby the alignment of coils 5 can be improved.

(4) MODIFICATIONS

Hereinafter, modifications of the embodiment will be described. However, constituents in common with those in the above-described embodiment are given the same reference symbols, and descriptions thereof are suitably omitted. Furthermore, configurations of the modifications described below can be applied in suitable combination with the configurations described in the above-described embodiment.

(4.1) Modification 1

Figure 3:
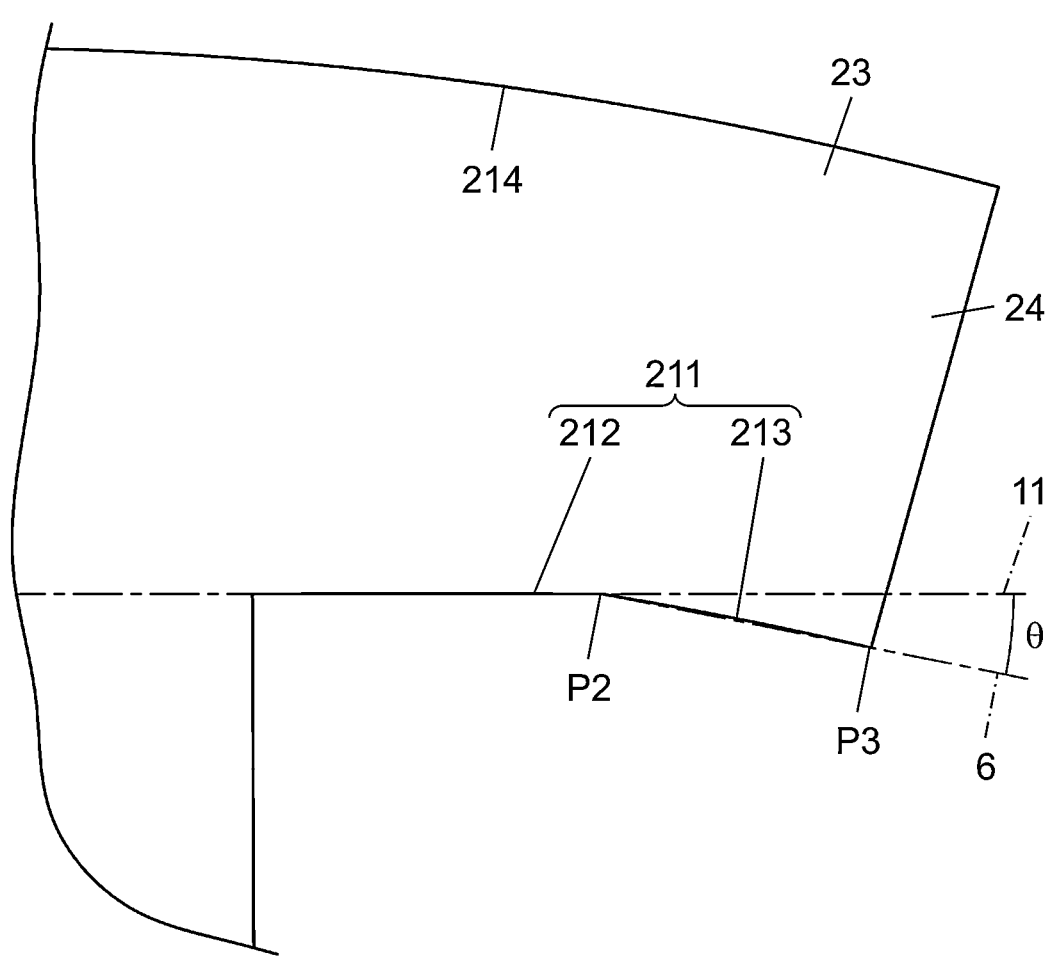
FIG. 3 is a plan view of a main part of a stator according to Modification 1.

FIG. 3 is a plan view of a main part of stator 2 according to Modification 1. Second inclined face 213 of stator 2 in the above-described embodiment is a flat face. In contrast to the above-described embodiment, second inclined face 213 of stator 2 in Modification 1 is a curved face, as illustrated in FIG. 3. More specifically, in Modification 1, second inclined face 213 is, for example, a curved face recessed in the direction of outer circumferential face 214. Furthermore, second inclined face 213 has a cross section perpendicular to the axial direction of arc-shaped yoke unit 24 (the axial direction of annular-shaped yoke 21), the cross section being in the shape of an arc concentric with outer circumferential face 214. In this case, angle θ formed by second inclined face 213 with second perpendicular face 212 is defined as an angle formed by second perpendicular face 212 with virtual line 6 which is a virtual straight line passing through bend point P2 and end point P3 of second inclined face 213, when viewed in the axial direction of yoke unit 24 (the axial direction of yoke 21).

(4.2) Modification 2

Figure 4:
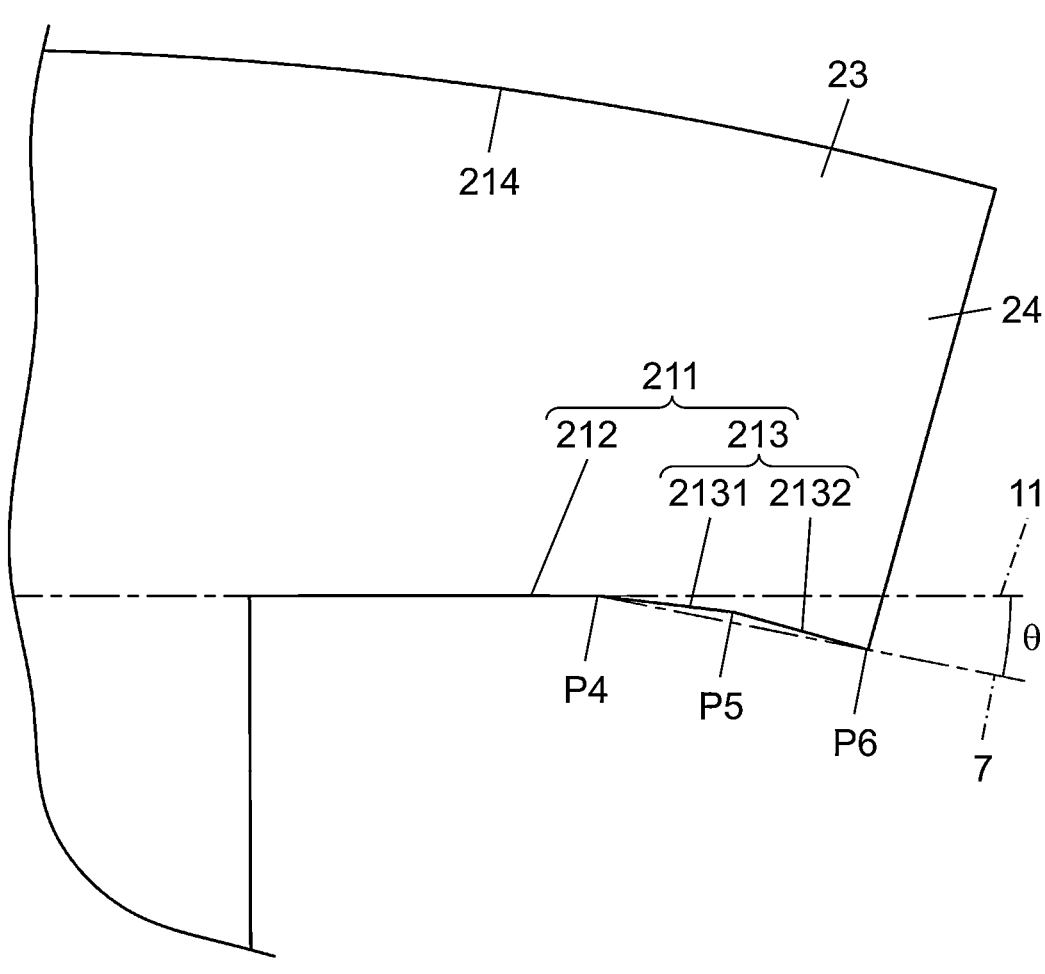
FIG. 4 is a plan view of a main part of a stator according to Modification 2.

FIG. 4 is a plan view of a main part of stator 2 according to Modification 2. As illustrated in FIG. 4, stator 2 in Modification 2 is different from those of the above-described embodiment and Modification 1 in that second inclined face 213 includes a plurality of faces inclined different angles with respect to second perpendicular face 212. In the case where second inclined face 213 includes, for example, two contiguous flat faces (first flat face 2131, second flat face 2132), inner circumferential face 211 includes first bend point P4 serving as a boundary between second perpendicular face 212 and first flat face 2131, and second bend point P5 serving as a boundary between first flat face 2131 and second flat face 2132, when viewed in the axial direction of yoke unit 24 (the axial direction of yoke 21). In this case, angle θ formed by second inclined face 213 with second perpendicular face 212 is defined as an angle formed by second perpendicular face 212 with virtual line 7 which is a virtual straight line passing through first bend point P4 and second bend point P6 of second inclined face 213, when viewed in the axial direction of yoke unit 24.

(4.3) Other Modifications

Figure 5:
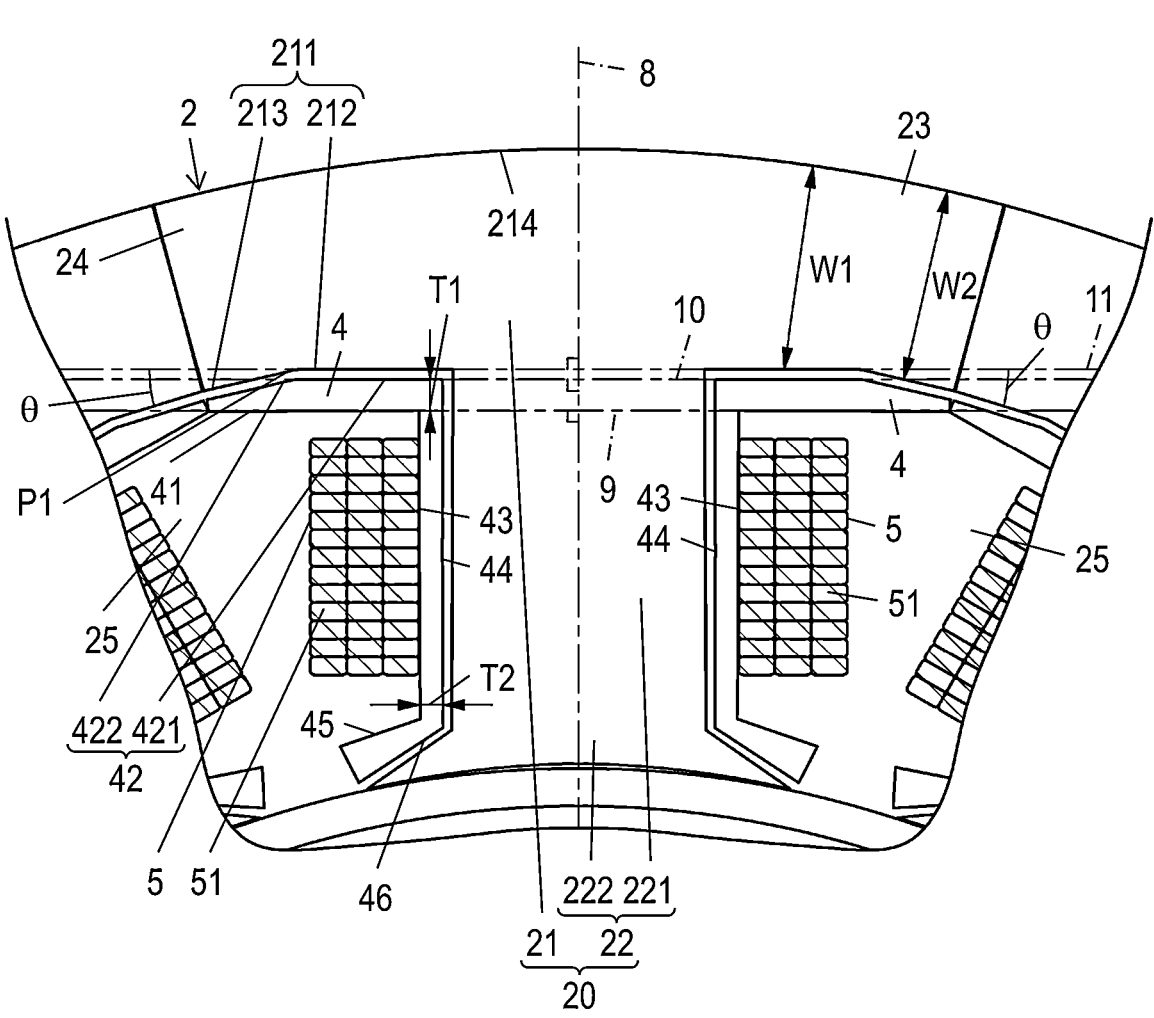
FIG. 5 is a partial cross-sectional view of a stator according to other modifications.

FIG. 5 is a cross-sectional view of a part of stator 2 according to other modifications. As illustrated in FIG. 5, winding 51 forming coil 5 may be what-is-called a flat wire having a rectangular cross section. Compared with coil 5 formed of a round wire, coil 5 formed of a flat wire can lead to a smaller gap between windings 51, whereby the amount of current flowing per unit cross-section area of coil 5 can be increased. Furthermore, coil 5 formed of the flat wire can lead to a smaller gap between first face 41 of insulator 4 and coil 5, whereby the alignment of coil 5 can be improved. Furthermore, thermal conductivity between coil 5 and insulator 4 can be enhanced.

(5) CONCLUSION

As described above, stator (2) according to a first aspect includes stator core (20), insulator (4), and coil (5). Stator core (20) includes: annular-shaped yoke (21); and teeth (22) protruding from yoke (21) to the inside of yoke (21). Insulator (4) covers at least a part of stator core (20). Coil (5) is disposed around at least one of teeth (22) via insulator (4). Insulator (4) includes: first face (41) facing coil (5); and second face (42) facing yoke (21). First face (41) is perpendicular to the protrusion direction of teeth (22). Second face (42) includes: first perpendicular face (421) perpendicular to the protrusion direction of teeth (22); and first inclined face (422) inclined toward first face (41) with respect to first perpendicular face (421). Yoke (21) includes inner circumferential face (211) facing second face (42) of insulator (4).

According to the first aspect, the possibility of a decrease in the torque of rotary electric machine (1) can be reduced.

In stator (2) according to a second aspect, inner circumferential face (211) of yoke (21) in the first aspect includes: second perpendicular face (212) and second inclined surface (213). Second perpendicular face (212) is perpendicular to the protrusion direction of teeth (22) and faces first perpendicular face (421) of insulator (4). Second inclined face (213) is inclined toward second face (42) of insulator (4) with respect to second perpendicular face (212) and faces first inclined face (422) of insulator (4).

According to the second aspect, a portion with a large area of a cross section perpendicular to the circumferential direction of yoke (21) can be provided.

In stator (2) according to a third aspect, second inclined face (213) of yoke (21) in the second aspect is a flat face.

According to the third aspect, stator (2) can be more easily manufactured.

In stator (2) according to a fourth aspect, second inclined face (213) of yoke (21) in the second aspect includes a curved face.

According to the fourth aspect, while magnetic saturation of yoke (21) is reduced, an area of slot (25) is increased to make insulator (4) thicker, whereby strength and moldability can be enhanced.

In stator (2) according to a fifth aspect, yoke (21) in the second aspect further includes outer circumferential face (214) opposite inner circumferential face (211). At least a part of outer circumferential face (214) of yoke (21) is an arc-shaped face having an arc-shaped cross section perpendicular to the axial direction of yoke (21). Second inclined face (213) of yoke (21) is a face in an arc shape, the face having a cross section perpendicular to the axial direction of yoke (21), the cross section being in the shape of an arc concentric with the arc-shaped face of yoke (21).

According to the fifth aspect, while magnetic saturation of yoke (21) is reduced, an area of slot (25) is increased to make insulator (4) thicker, whereby strength and moldability can be enhanced.

In stator (2) according to a sixth aspect, stator core (20) in any one of the second to fifth aspects includes N slots (25) (N is an integer not less than 2) each being a space between teeth (22) circumferentially adjacent to each other among teeth (22). An angle ($\theta$) formed by second inclined face (213) with second perpendicular face (212) satisfies $0° < \theta \leq (180/N)°$.

According to the sixth aspect, the minimum value of the area of a cross section perpendicular to the circumferential direction of yoke (21) is increased, whereby magnetic saturation can be reduced.

In stator (2) according to a seventh aspect, coil (5) in any one of the second to sixth aspects is formed of winding (51) having a rectangular cross section.

According to the seventh aspect, the alignment of coil 5 can be improved, and thermal conductivity between coil 5 and insulator 4 can be enhanced.

Rotary electric machine (1) according to an eighth aspect includes: stator (2) according to any one of the first to seventh aspects; and rotor (3) disposed inside stator (2) and configured to rotate with respect to stator (2).

According to the eighth aspect, rotary electric machine (1) capable of substantially preventing the occurrence of magnetic saturation in the inside of stator (2) can be provided.

Note that the second to seventh aspects are not necessarily essential to stator (2) and can be suitably omitted.

REFERENCE MARKS IN THE DRAWINGS

1 . . . rotary electric machine
2 . . . stator
4 . . . insulator
5 . . . coil
20 . . . stator core
21 . . . yoke
22 . . . teeth
25 . . . slot
41 . . . first face
42 . . . second face
211 . . . inner circumferential face
212 . . . second perpendicular face
213 . . . second inclined face
214 . . . outer circumferential face
421 . . . first perpendicular face
422 . . . first inclined face
$\theta$ . . . angle

What is claimed is:

1. A stator, comprising: a stator core including a yoke having an annular shape, and teeth protruding from the yoke to an inside of the yoke; a first insulator covering at least a first part of the stator core and a part of a first tooth of the teeth; a second insulator covering at least a second part of the stator core and a part of a second tooth of the teeth adjacent to the first tooth; a first coil disposed around the first tooth via the first insulator; and a second coil disposed around the second tooth via the second insulator, wherein each of the first insulator and the second insulator includes a first face facing a corresponding one of the first coil and second coil, and a second face facing the yoke, the first face being perpendicular to a protrusion direction of the teeth, the second face including a first perpendicular face perpendicular to the protrusion direction of the teeth, and a first inclined face inclined toward the first face with respect to the first perpendicular face, and wherein the yoke includes an inner circumferential face facing the second face, and the first insulator is directly adjacent to the second insulator.

2. The stator according to claim 1, wherein the inner circumferential face of the yoke includes:
   a second perpendicular face being perpendicular to the protrusion direction of the teeth and facing the first perpendicular face; and
   a second inclined face being inclined toward the second face of one of the first insulator and the second insulator with respect to the second perpendicular face and facing the first inclined face.

3. The stator according to claim 2, wherein the second inclined face of the yoke is a flat face.

4. The stator according to claim 2, wherein
the second inclined face of the yoke includes a curved
   face.

5. The stator according to claim 2, wherein
the yoke further includes an outer circumferential face
   opposite the inner circumferential face,
at least a part of the outer circumferential face of the yoke
   is an arc-shaped face having an arc-shaped cross sec-
   tion perpendicular to an axial direction of the yoke, and
the second inclined face of the yoke is a face in an arc
   shape, the face having a cross section perpendicular to
   the axial direction, the cross section being in a shape of
   an arc concentric with the arc-shaped face of the yoke.

6. The stator according to claim 2, wherein
the stator core includes N slots (the N being an integer not
   less than 2) each being a space between the teeth
   circumferentially adjacent to each other, and
an angle $\theta$ formed by the second inclined face with the
   second perpendicular face satisfies $0°<\theta\leq(180/N)°$.

7. The stator according to claim 1, wherein each of the
first coil and second coil is formed of a winding having a
rectangular cross section.

8. A rotary electric machine, comprising:
the stator according to claim 1; and
a rotor disposed inside the stator and configured to rotate
   with respect to the stator.

* * * * *